United States Patent

Jönsson

[11] Patent Number: 4,572,526
[45] Date of Patent: Feb. 25, 1986

[54] DEVICE FOR CLAMPING TOOLS

[75] Inventor: Lars E. Jönsson, Eslöv, Sweden

[73] Assignee: AB Lofab-Square, Malmo, Sweden

[21] Appl. No.: 481,408

[22] Filed: Apr. 1, 1983

[30] Foreign Application Priority Data

Apr. 13, 1982 [SE] Sweden ............................... 8202293

[51] Int. Cl.⁴ .............................................. B23B 31/30
[52] U.S. Cl. ......................................... 279/4; 279/2 A
[58] Field of Search ......................... 279/4, 2 A, 1 Q; 409/234

[56] References Cited

U.S. PATENT DOCUMENTS

| 2,911,222 | 11/1959 | Eve | 279/4 |
| 2,982,557 | 5/1961 | Anschutz | 279/4 |
| 3,647,231 | 3/1972 | Schafer | 279/4 |
| 3,677,559 | 7/1972 | Andre et al. | 279/4 X |
| 4,103,914 | 8/1978 | Rohm | 279/4 |
| 4,387,906 | 6/1983 | Nicolin | 279/4 |

FOREIGN PATENT DOCUMENTS

| 3408266 | 10/1984 | Fed. Rep. of Germany | 279/4 |
| 382517 | 11/1964 | Switzerland | 279/4 |
| 419783 | 3/1967 | Switzerland | 279/4 |
| 1035395 | 7/1966 | United Kingdom | 279/4 |
| 1066211 | 4/1967 | United Kingdom | 279/4 |
| 2100627 | 1/1983 | United Kingdom | 279/4 |
| 2118461 | 11/1983 | United Kingdom | 279/4 |
| 0884145 | 7/1981 | U.S.S.R. | 279/150 |

Primary Examiner—Gil Weidenfeld
Assistant Examiner—Glenn L. Webb
Attorney, Agent, or Firm—Pearne, Gordon, Sessions, McCoy, Granger & Tilberry

[57] ABSTRACT

A device for clamping tools, such as a shank-end mill, comprises an adjusting nut having a bore for receiving and actuating an adapter sleeve for mechanical clamping of the tool. The adjusting nut has at least one pressure medium chamber accommodating a piston and opening into the bore where it is sealed by means of a membrane adapted to rest against the adapter sleeve. A complementary nut is mounted on said adjusting nut for displacing said piston within said chamber, thereby to effect pressure medium-controlled, complementary clamping of the tool.

8 Claims, 2 Drawing Figures

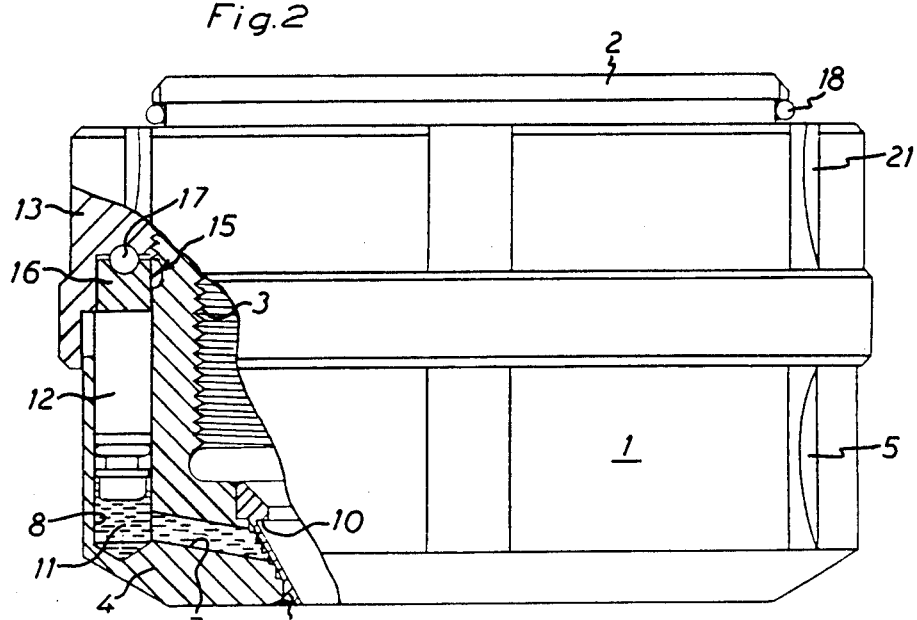
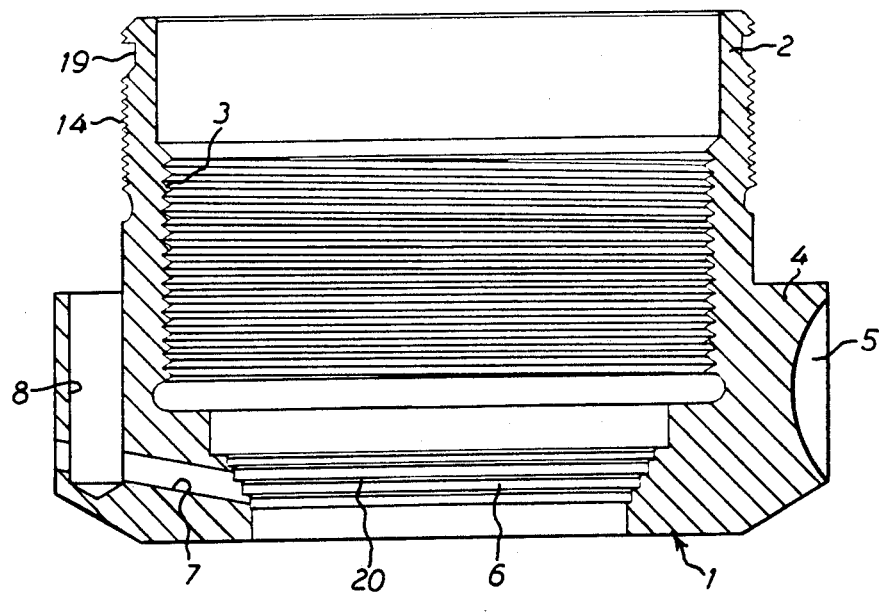

DEVICE FOR CLAMPING TOOLS

The present invention relates to a device for clamping tools, said device comprising an adjusting nut having a bore for receiving and actuating an adapter sleeve for mechanical clamping of the tool. More particularly, the invention relates to a nut assembly for locking a shank-end mill in a tool holder which, in its turn, is clamped in a machine, possibly via an end mill arbor.

Present day draw back chucks comprise a holder adapted for connection to a machine and having a conical bore for receiving a conical adjuster sleeve. The free end of the holder has an outer thread for an adjusting nut adapted to displace the adapter sleeve inwardly within the holder for clamping a shank-end mill inserted in the adapter sleeve.

Tightening of the adjusting nut is effected mechanically by means of a spanner. It has been found, however, that such mechanical clamping is not enough because the end-shank mill may come loose during milling and damage the workpiece, the shank-end mill and the draw back chuck.

The hydraulic clamping of tools has long been known, for example from U.S. Pat. Nos. 3,677,559, 2,911,222 and 4,103,914. Furthermore, it is already known from Swedish patent specification No. 418,467 first to clamp a tool mechanically in a tool holder and then to effect a complementary hydraulic clamping of the tool. The hydraulic clamping appliance is mounted in the tool holder, and the transition from mechanical clamping to mechanical-hydraulic clamping thus necessitates replacing the conventional tool holder by a tool holder provided with a hydraulic clamping appliance. Furthermore, the hydraulic clamping is effected by operating a thrust screw, whereas the mechanical clamping is effected in conventional manner by tightening of the adjusting nut. It will be readily understood that the construction according to Swedish patent specification No. 418,467 extends the time required for this change of tools and renders the conventional tool holders superfluous, which is a waste of money.

It is, therefore, the object of this invention to provide a device of the above-mentioned type permitting complementary hydraulic clamping while using a conventional tool holder.

To this end, the device according to the invention is characterised in that the adjusting nut has at least one pressure medium chamber accommodating a piston and opening into the bore where it is sealed by means of a membrane adapted to rest against the adapter sleeve, and that a complementary nut is mounted on the adjusting nut for displacing the piston within the chamber, thereby to effect pressure medium-controlled, complementary clamping of the tool.

The invention will be described in more detail below, reference being had to the accompanying drawing in which:

FIG. 1 is a cross-section of an adjusting nut comprised by the device according to the invention; and FIG. 2 is a lateral view, partly in section, of the device according to the invention.

The adjusting nut 1 shown in FIG. 1 comprises a cylindrical portion 2 having a cylindrical inner circumference and an inner right-handed thread 3 adapted to engage an outer thread on a tool holder (not shown). The adjusting nut 1 also has a cylindrical adjusting portion 4, the outer circumference of which has been formed with spanner engagement means 5 for tightening the nut, while the inner circumference of said adjusting portion 4 is essentially conical and has a number of axially spaced apart, circumferential grooves 6. Opening into these grooves are three essentially radial passageways 7 (only one is shown in FIG. 1) formed in the adjusting portion 4 and uniformly distributed around the periphery of said adjusting portion. Communicating with each passageway 7 is an axial piston chamber 8 formed in the adjusting portion 4. The passageway 7 and the piston chamber 8 together form a hydraulic fluid chamber whose function is explained below.

In FIG. 2, the sectioned part of the device illustrates the essential feature of the invention, i.e. the possibility of providing a hydraulic complementary clamping of a tool, such as a shank-end mill. A conical annular membrane 9 is welded to the conical circumference of the adjusting portion 4 to cover the grooves 6. The ends of the membrane have been made thicker, and the inner end has a projection 10 adapted to engage with a corresponding projection on the adapter sleeve (not shown), said last-mentioned projection snapping behind the projection 10 when the adapter sleeve is inserted in the adjusting nut from the cylindrical portion 2 thereof.

A hydraulic fluid 11, preferably oil or grease, has been supplied to the hydraulic chambers 7, 8, and pistons 12 are inserted in the piston chambers 8. These pistons preferably are made of steel and have a sealing ring at the forward end. Such pistons are in common use in hydraulic technique and therefore form no part of the invention.

Upon axial displacement of the piston 12 into the piston chamber 8, the membrane is actuated and, in its turn, actuates the shank-end mill via the adapter sleeve. The hydraulic fluid entering the grooves 6 causes the pressure exerted by the hydraulic fluid to be uniformly distributed over the membrane.

Displacement of the three pistons in the piston chambers 8 is accomplished by a hydraulic nut 13 having a left-handed thread and screwed onto the cylindrical portion 2 of the adjusting nut 1. The hydraulic nut engages a left-handed thread 14 on the outer circumference of the cylindrical portion (FIG. 1). By rotating the nut 13, the piston thus can be axially displaced.

To reduce the friction between the hydraulic nut 13 and the pistons 12, a ball bearing 15 has been positioned between the nut and the pistons. The ball bearing comprises a bearing race 16 provided in its upper face with a circumferential groove containing balls 17. A corresponding groove has been formed in the hydraulic nut 13 opposite the groove in the ball bearing race.

An elastic locking ring 18 is positioned in a groove 19 (FIG. 1) in the outer circumference of the cylindrical portion and is adapted to limit the displacement of the hydraulic nut 13 away from the pistons 12, thereby to prevent that the pistons are moved out of the piston chambers 8 to such an extent that the hydraulic fluid 11 will leak out.

The circumferencial edges 20 between the grooves 6 serve to support the membrane 9 when it is urged radially outwardly upon mechanical clamping of the shank-end mill before a hydraulic counterpressure has been built up.

Clamping of the shank-end mill in the draw back chuck is accomplished in the following manner: The adjusting nut 1 with the adapter sleeve is screwed onto the tool holder. After the shank-end mill has been inserted in the adjusting nut, the nut is tightened on the tool holder by means of a spanner which is applied to the spanner engagement means 5 so that the adapter sleeve, owing to the conical surfaces on the tool holder and the adapter sleeve, will clamp the shank-end mill in position. The spanner is then transferred to the spanner engagement means 21 on the hydraulic nut 13 which is screwed into engagement with the pistons 12 to displace the latter so that a hydraulic complementary clamping of the shank-end mill is obtained. Because the thread of the hydraulic nut is left-handed, the spanner can all the time be rotated in the same direction.

The invention is not restricted to the clamping of a shank-end mill in a draw back chuck, but may be used in many other connections where it is desired to clamp a tool or similar element to a holder.

What I claim and desire to secure by Letters Patent is:

1. A device for clamping a tool to a holder, such as a shank-end mill, said device comprising an adjusting nut having a bore for receiving and actuating an adapter sleeve for mechanical clamping of the tool when said adjusting nut is mounted onto the holder, said adjusting nut (1) has at least one pressure medium chamber (7, 8) accommodating a piston (12) and opening into the bore where it is sealed by means of a membrane (9) adapted to rest against the adapter sleeve, and a complementary nut (13) mounted on said adjusting nut for displacing the piston within the chamber, thereby to effect pressure medium-controlled complementary clamping of the tool, said membrane being situated at and firmly attached to the end of said adjusting nut (1) facing away from the holder and being tilted towards and facing the holder to provide both axial and radial forces clamping the tool when said complementary nut effects said complementary clamping, said axial force component pressing the adapter sleeve and the tool towards the holder and said pressure medium applying a hydraulic clamping force to the tool where the tool exits said adjusting nut, thereby minimizing radial movement of the tool relative to said adjusting nut.

2. A device as claimed in claim 1, characterised by three pressure medium chambers (7, 8) equidistantly spaced apart around the circumference of the adjusting nut (1).

3. A device as claimed in claim 1 or 2, characterised in that the membrane-receiving portion of the adjusting nut (1) has at least one circumferential groove (6) into which the pressure medium chamber or chambers (7, 8) open.

4. A device as claimed in claim 3, characterised in that the said portion of the adjusting nut (1) has several axially spaced apart circumferential grooves (6), the areas between said grooves forming supporting ledges (20) for the membrane 9.

5. A device as claimed in claim 1, characterised by a ball bearing (15) positioned between the piston (12) and the complementary nut (13).

6. A device for clamping a tool according to claim 1, wherein said bore has an interior threaded portion cooperating with a threaded portion on the holder whereby the adapter sleeve engages and mechanically clamps the tool when said adjusting nut is screwed onto the holder.

7. A device for clamping a tool according to claim 6, wherein said holder is a chuck.

8. A device according to claim 6, wherein said membrane is firmly attached to said adjusting nut adjacent the adapter sleeve at said end of the adjusting nut facing away from the holder, said pressure medium applies a hydraulic clamping force to the tool over substantially the entire engaging area of the adapter sleeve when said complementary nut displaces the piston to effect complementary clamping of the tool.

* * * * *